United States Patent [19]
Kaye et al.

[11] 3,841,745
[45] Oct. 15, 1974

[54] PORTABLE MICROFILM VIEWER

[75] Inventors: Morton Kaye, Stamford, Conn.;
Marvin I. Radlauer, 2 Mistletoe Dr., Matawan, N.J.

[73] Assignee: said Radlauer, by said Kaye

[22] Filed: Sept. 12, 1973

[21] Appl. No.: 396,418

Related U.S. Application Data

[62] Division of Ser. No. 194,724, Nov. 1, 1971, Pat. No. 3,791,778.

[52] U.S. Cl. ................................................ 353/26
[51] Int. Cl. ...................... G03b 21/11, G03b 21/30
[58] Field of Search ..................... 353/25, 26, 74–78; 352/169, 181, 191

[56] References Cited
UNITED STATES PATENTS

| | | | |
|---|---|---|---|
| 1,762,932 | 6/1930 | Mihalyi | 353/96 |
| 2,198,417 | 4/1940 | Scheibell | 352/169 |
| 2,624,231 | 1/1953 | Kingston | 353/78 |
| 3,124,039 | 3/1964 | Anderson | 353/95 |
| 3,319,517 | 5/1967 | Rondas | 353/78 |
| 3,479,116 | 11/1969 | Anderson | 353/77 |

FOREIGN PATENTS OR APPLICATIONS

| | | | |
|---|---|---|---|
| 93,272 | 1/1969 | France | 353/78 |
| 860,016 | 1/1971 | Canada | 353/74 |

*Primary Examiner*—Louis R. Prince
*Assistant Examiner*—A. J. Mirabito
*Attorney, Agent, or Firm*—Louis Altman

[57] ABSTRACT

A portable microfilm viewer is described, which is of compact structure. The viewer includes a control for advance of the microfilm with a lock-out feature whereby single frame advance is deactivated when continuous rapid film advance is selected. The microfilm viewer is adapted to stand upright on a flat surface, with a fold-out viewing screen supported in reading position by side-located shades. The shades fold protectively over the viewing screen when it is not in use, and provide shading against ambient light interference when the screen is in use.

7 Claims, 9 Drawing Figures ic viewer of FIG. 1.

PORTABLE MICROFILM VIEWER

This application is a division of application Ser. No. 194,724, filed Nov. 1, 1971 now U.S. Pat. No. 3,791,728, issued Feb. 12, 1974.

FIELD OF THE INVENTION

This invention relates to a film viewer and more specifically to a portable microfilm viewer for use at any desired location.

BACKGROUND AND SUMMARY OF THE INVENTION

Portable microfilm viewers have been previously described as for example in the patents to Allen U.S. Pat. No. 3,498,707, Stoothoff U.S. Pat. No. 3,234,848, and Rondas et al. U.S. Pat. No. 3,319,517. In general, such prior art devices have left much to be desired from the standpoint of compactness, place or position of utility, and versatility and ease of selection of such control functions as rapid, continuous film advance versus single frame advance, forward versus reverse film motion, etc.

In a portable microfilm reading device in accordance with the invention a compact film viewer for displaying images of a microfilm mounted on a cassette may be used at any convenient location. The film cassette includes a microfilm which bears a large number of frames spaced at regular intervals along the film. A desired frame may be selected for display by advancing the microfilm past a viewing port at a rapid speed towards a general film region which is known to include the desired frame. When this film region appears, a frame by frame film advancing control is provided to enable the operator to select the desired frame for display. The control for advancing the microfilm includes a lock-out feature whereby the single frame advance is deactivated when the microfilm is rapidly advanced.

The micro-film viewer in accordance with the invention has a compact structure adapted to stand upright on a flat surface such as a reading table, with a foldout viewing screen supported in a reading position by side located shades. The side shades are foldably mounted to wrap protectively around the viewing screen when it is not in use. The side shades conveniently retain the screen in a reading position while reducing interference from ambient light.

These advantages and others may be appreciated from the following description of a preferred embodiment of the microfilm viewer in accordance with the invention.

DETAILED DESCRIPTION OF THE PREFERRED EMBODIMENT

Figure 1:
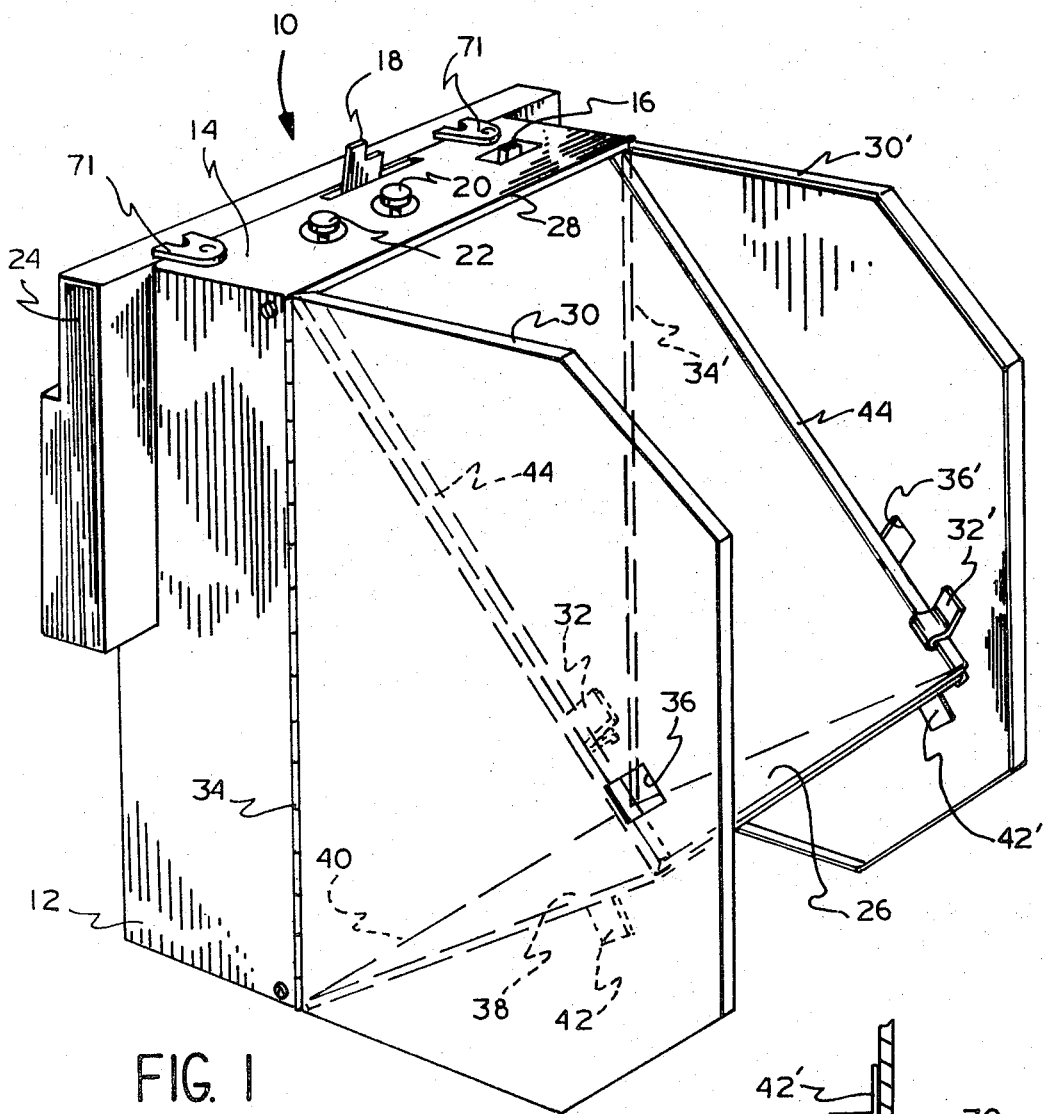
FIG. 1 is a perspective view of a microfilm viewing device in accordance with the invention and shown in an operative position.

With reference to FIG. 1 a microfilm viewing device 10 is shown in operative film image displaying position. The microfilm viewer has a housing 12 of a generally rectangular shape to enable the housing to stand upright on a table. The housing 12 has an upper surface 14 from which control elements project. The control elements include an on/off power switch 16, a reversing lever 18, a continuous film advance lever 20 and a single frame film advance lever 22. The rear housing 12 supports a microfilm cassette 24. The housing 12 encloses film image projecting optics which projects images on a translucent viewing screen 26 located at a frontal side of the housing. The translucent screen 26 is horizontally hinged at 28 to fold out as shown into an operative reading position where it held by side located shade plates 30—30' having suitable retaining brackets 32—32'. The shade plates 30—30' are vertically hinged at 34—34' respectively and fold over the screen 26 to protect the screen and made the portable film viewer compact when folded down. The viewing screen 26 is provided with cut-outs 36—36' which are located to receive brackets 32—32' respectively when the side shades are folded down over the viewing screen 26.

A mirror 38 is horizontally hinged at 40 to the housing 12 and when folded out rests on tabs 42—42' located on side shades 30—30' respectively. The brackets 32 and tabs 42 are carefully located to obtain a desired angular relationship between the screen 26 and mirror 38, and achieve an undistorted display of images on the screen 26. The retaining brackets 32, as shown in FIG. 2, each include a U-shaped member 44 sized to frictionally receive and retain an outer edge of the viewing screen 26.

Figure 2:
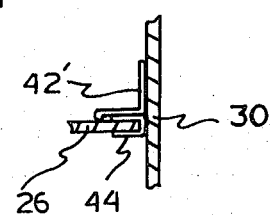
FIG. 2 is a section view of a support bracket employed to retain the viewing screen.

As shown in FIG. 2 the rear surface of housing 12 includes a cassette support area 46 shaped to receive the microfilm cassette 24. The area 46 includes a pair of reel hubs 48—48' which respectively engage reels 50—50' on the cassette 24. The reels 50—50' may be designated as wind-up and take-up reels depending upon the desired direction of movement of the microfilm. The reel hubs 48—48' are provided with ribs such as 52 for positive engagement with the cassette mounted reels 50—50' in a manner which is commonly used in cassette drives.

The cassette 24 has a viewing frame 54 with an aperture 56 aligned with the microfilm 58 to view its frames. The microfilm 58 is wound around reels 50—50' and threaded with the viewing frame 54 to fit in a space 60 formed between portions of an optical projection system such as a light source 62 and a reflector prism 64. When the cassette 24 is mounted in area 46 of housing 12 the prism 64 protrudes into a recess 66 behind the viewing frame 54. The cassette 24 seats against a wall 68 of housing 12 in alignment with the microfilm frames and beneath a spring biased retainer 70 so that the microfilm 58 and viewing frame 54 are accurately located with reference to the optical projection system. Cassette supporting tabs 71 maintain the cassette 24 in operative position relative to the optical projection system. A film gate 72, formed by a pair of upright members 74—74', is located in front of wall 68. The film gate 72 is mounted for pivoting movement about a pin 73 (see FIG. 7) and when actuated pivots away from wall 68 in the direction of the arrow 76 to enable a film claw 78 to separate itself from sprocket holes in the microfilm. The film claw 78 is employed to provide incremental film advance during frame by frame display of the microfilm 58.

Figure 4:
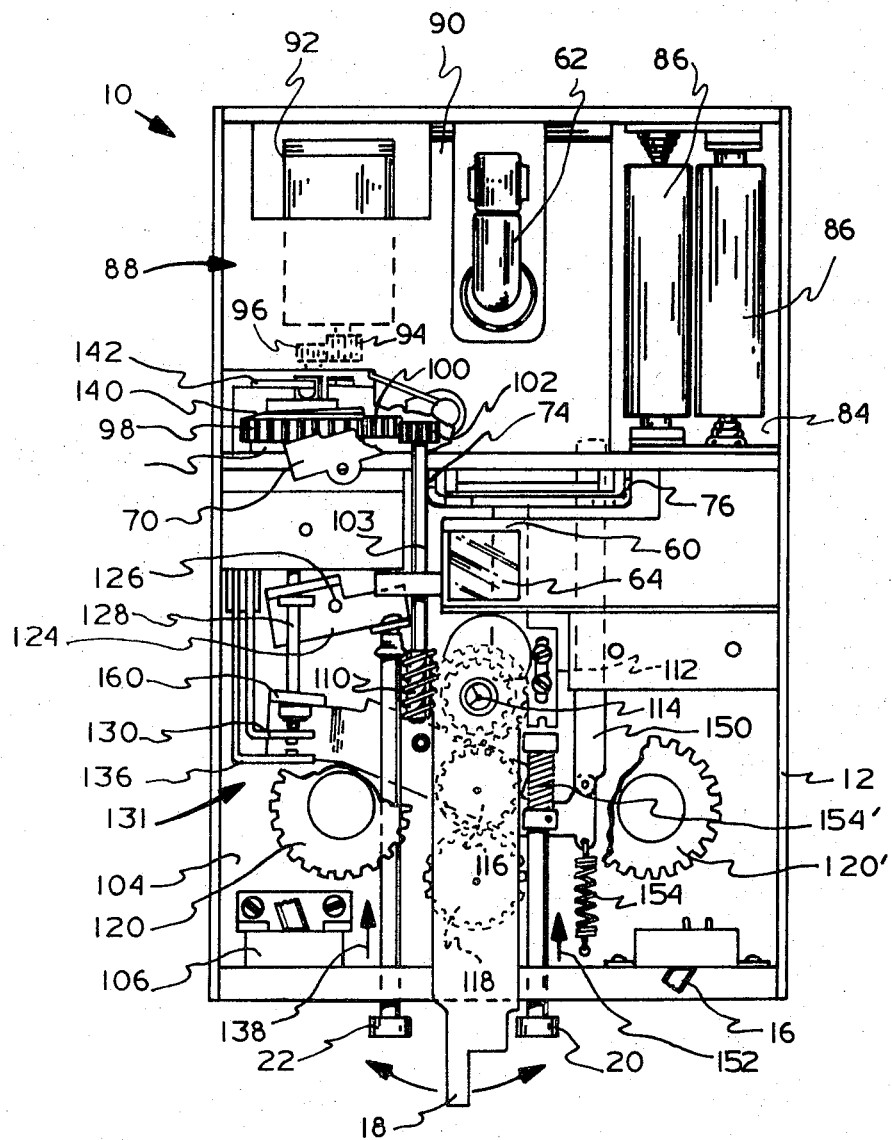
FIG. 4 is a top plan view of the microfilm viewer with its cover removed.

As shown in FIG. 4 the housing 12 is divided into a battery compartment 84 sized to retain batteries 86 which provide electrical power for drive train 88 located in a compartment 90, and for a light source 62. The drive train 88 includes motor 92 and gears 94, 96, 98, 100 and 102. The pinion 102 is mounted on a worm shaft 103 which protrudes into a control compartment 104 to deliver rotation drive. The control compartment 104 includes control elements such as the single frame advance lever 22, the continuous frame advance lever 20, the on/off power switch 16, the reversing lever 18 and a reversing switch 106. The reversing switch 106 and reversing lever 18 are coupled to one another by a bracket 108 (see FIG. 6). The light source 62, which is powered by batteries 86 through the on/off switch 16, shines a beam of light onto the reflecting prism 64 through the space 60 where the microfilm passes by.

Figure 3:
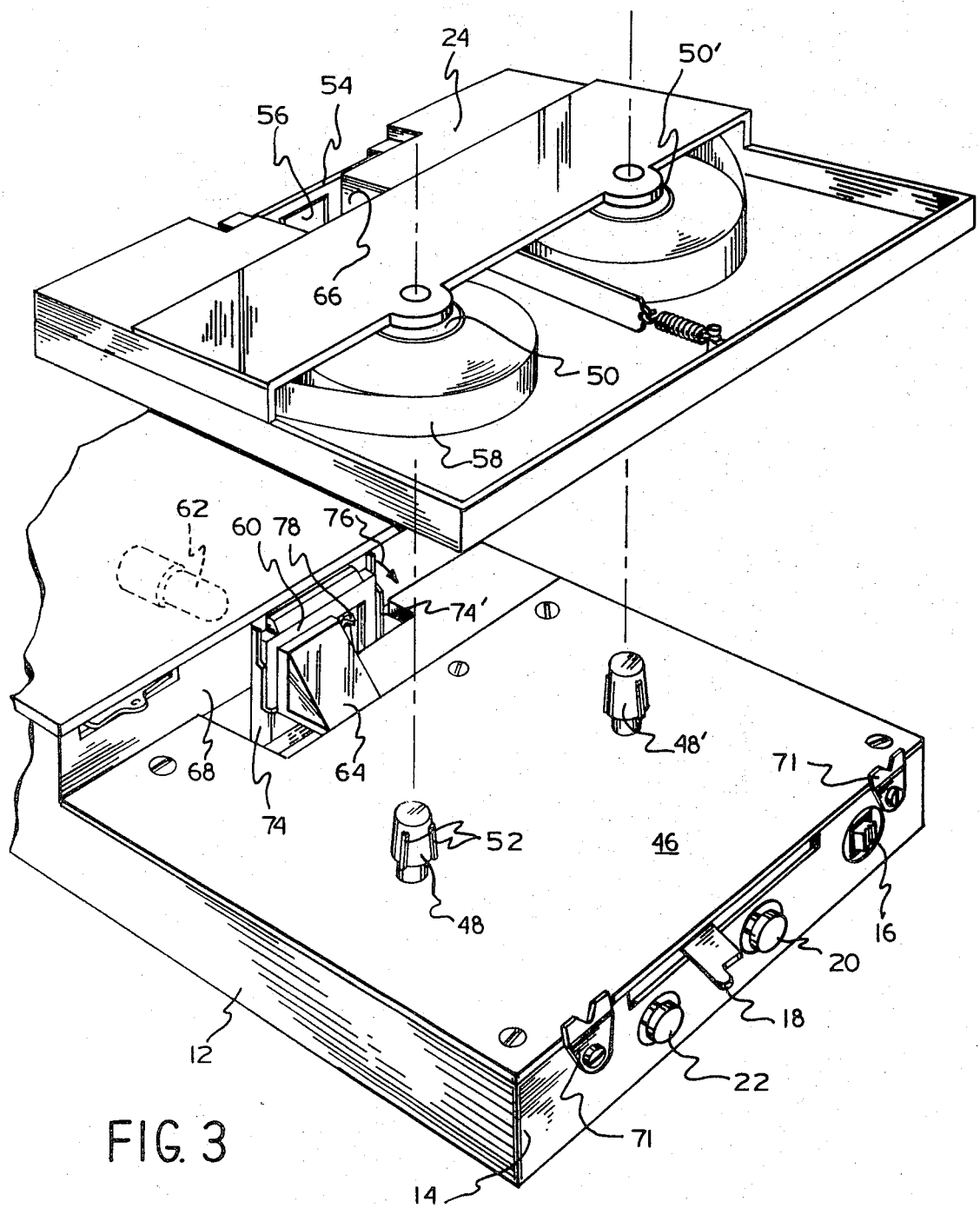
FIG. 3 is a perspective exploded view of the microfilm viewing device with the microfilm cassette shown disposed over its mounting area.

The worm shaft 103 has a worm 110 which engages a worm wheel 112 mounted on the reversing lever 18. The latter is pivotally mounted to the housing by a pivot pin 114 which also serves as an axis of rotation for the worm wheel 112. The worm wheel 112 in turn drives a first pinion 116 coupled to a second pinion 118, both of which are mounted on the reversing lever 18. Pinion 118 may engage either one of drive wheel 120—120' depending upon which direction the reversing lever is pivoted. Drive wheels 120—120' are respectively and coaxially coupled to the reel hubs 48—48' (see FIG. 3) so that the microfilm 58 may be moved in the desired direction.

The single frame advance control lever 22 engages a first control link 124 which is pivotally mounted to the housing 12 at 126. This link 124 in turn is coupled to a stop shaft 128 which is normally biased by a spring loaded switch contact 130 of a control switch 131 against a stop wheel 132. The stop wheel 132 is coaxially mounted on gear 98. The stop shaft 128 normally engages a recess or slot 134 (see FIG. 7) in the stop wheel 132 to prevent the latter's rotation. Another contact 136 of the control switch 131 is operatively disposed opposite the contact 130 to provide a normally open control switch in series with the electrical power line to motor 92. Thus, when the single frame advancing control lever is actuated in the direction indicated by arrow 138, the link 124 is pivoted counter-clockwise and moves the stop shaft 128 away from the stop wheel and against contact 130 of control switch 131 to cause the latter to close and provide electrical power to motor 92. As soon as the motor receives electrical power it causes a full rotation of stop wheel 132. After one full rotation the stop shaft 128 re-engages the stop 134 in the control wheel 132 to prevent further rotation and re-open the control switch 131.

During a single control wheel rotation a cam 140 is engaged by a cam follower 142 to operate film claw 78. The cam is coaxially mounted with the gear 98 and control wheel 132, and operation of the cam and film claw will be explained with reference to FIG. 7.

The continuous film advance control lever 20 as shown in FIG. 4 is coupled to a control member 150 which in turn engages the film claw 78 and the film gate 72. When lever 20 is moved in the direction of arrow 152 against the bias from springs 154-154', the film claw 78 disengages from the film 58. The continuous film advance control lever 20 is also connected to a second control link 156 which is pivotally mounted to the housing 12 at 157 and has an end 160 connected to the stop shaft 128. Thus, when the continuous film advance control lever 20 is actuated, link 158 is rotated counter-clockwise to move the stop shaft 128 to close the control switch 131 and release the stop wheel 132. The motor 92 may then be continuously actuated to advance the microfilm 58 for rapid movement to a desired region of the microfilm.

Figure 5:
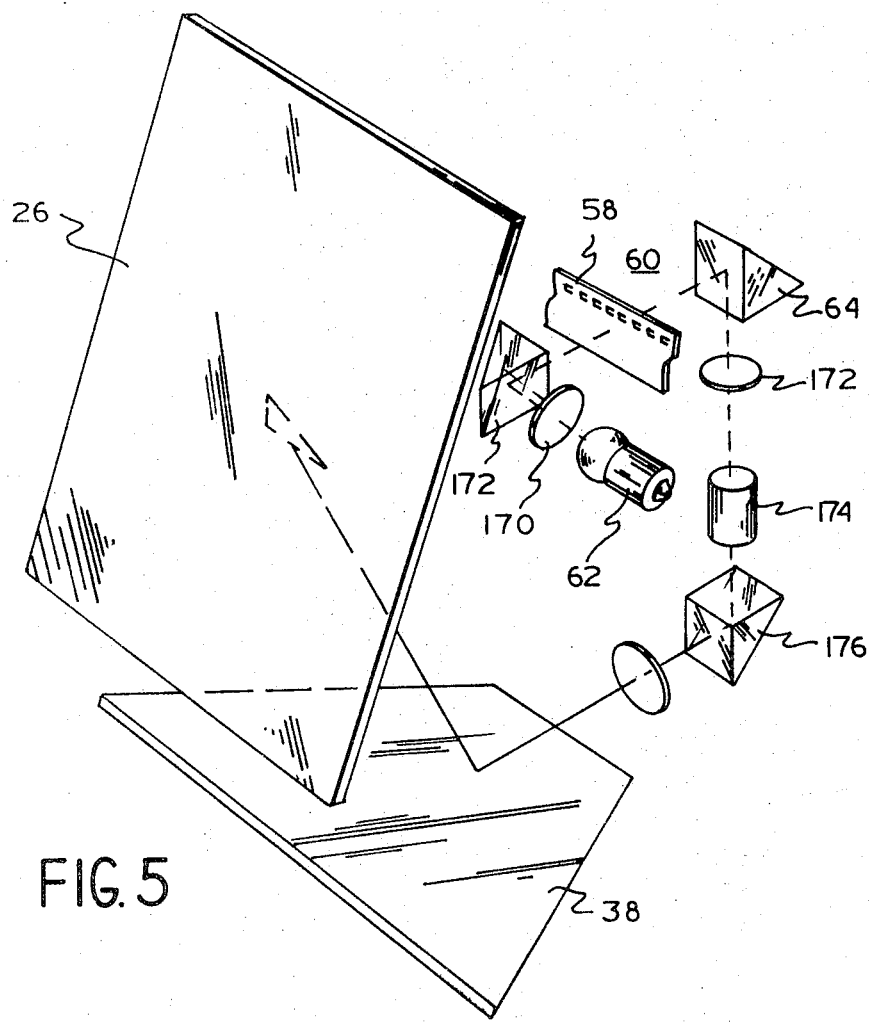
FIG. 5 is a perspective view of optical elements employed in the microfilm viewer of FIG. 1.

The optical viewing system employed with the microfilm viewer is shown in FIG. 5. The electrical light source 62 must operate at a voltage compatible with the voltage generated by batteries 86. A suitable focusing lens 170 is mounted in front of the light source 62 and directs the focused light onto a prism 172 located to reflect the light through the microfilm 58, prisms 64, lenses 172 and 174 and prism 176 to reflecting mirror plate 38 and then to translucent screen 26. An optical system as thus generally described is of conventional design and conveniently fits in the compact housing 12.

Figure 6:
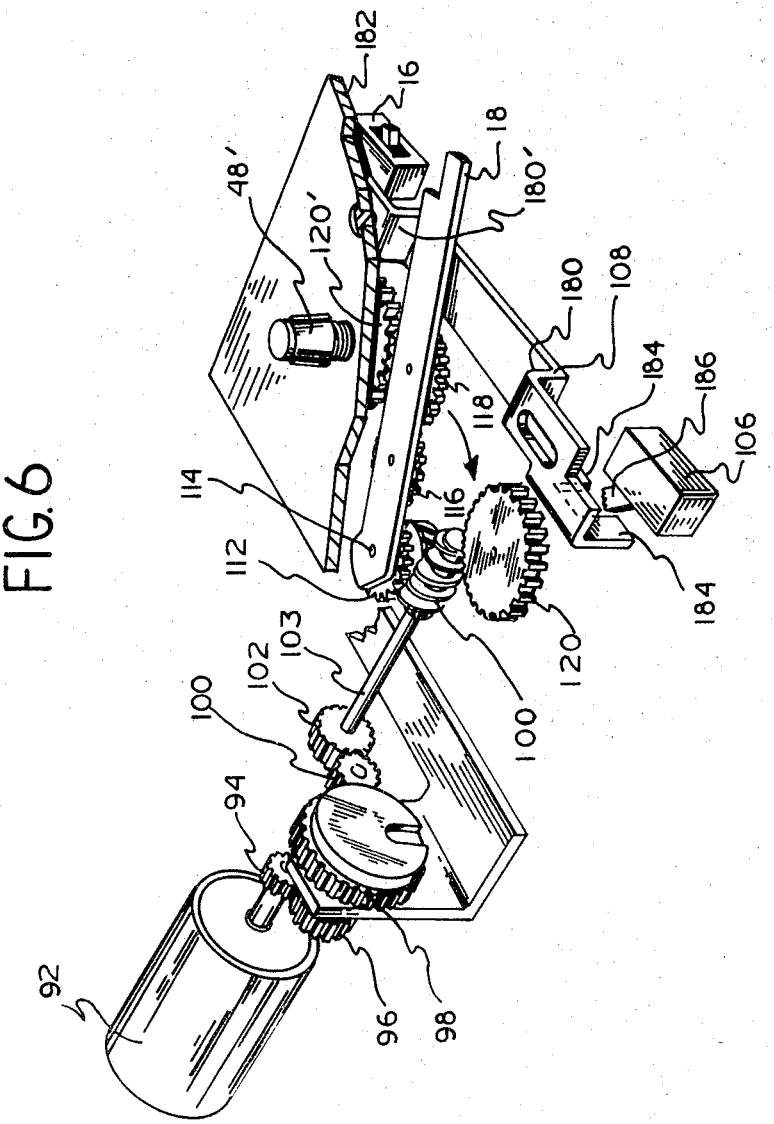
FIG. 6 is a perspective partially broken away view of the film drive employed in the microfilm viewer of FIG. 1.
Figure 9:
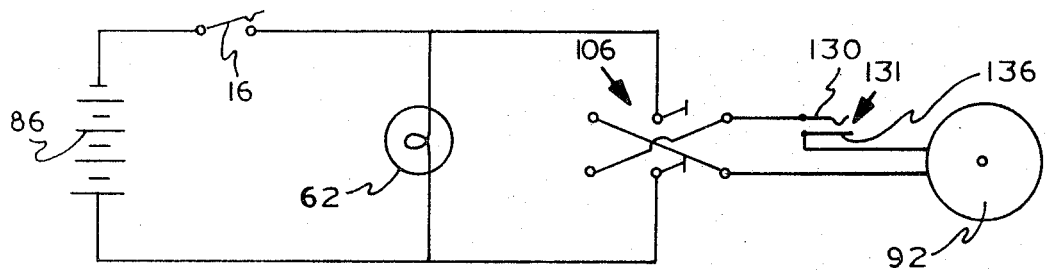
FIG. 9 is an electrical schematic of the circuitry used in the microfilm viewer of FIG. 1.

With reference to FIGS. 6 and 9 the drive and reversing control of the microfilm viewer 10 may be explained with greater clarity. As shown in FIG. 9, the electrical power from batteries 96 is coupled through power switch 16 to light source 62 and the motor 92. Electrical power to the motor may be reversed in polarity by reversing switch 106. Motor power, however, cannot be provided unless the control switch 131 is closed. Motor rotation reversal is accomplished by the lever 18 which is mounted to pass between a pair of spaced elbows 180—180' of reversing bracket 108. The reversing bracket 108 is slidably mounted below a cover plate 182 which normally encloses the control compartment 104. The reversing bracket 108 is provided with a pair of downwardly extending switch button engaging members 184 which are so spaced to enable them to embrace the actuating button 186 of the reversing switch 106. When the reversing lever 18 is pivoted in the direction of arrow 188 the elbow 180 of bracket 108 is engaged and the bracket 108 is moved to force the switch button 186 to its other position and cause a reversal of voltage polarity to the drive motor, along with a corresponding change in the motor drive train from the reel pinion 120' to the reel pinion 120.

Figure 7:
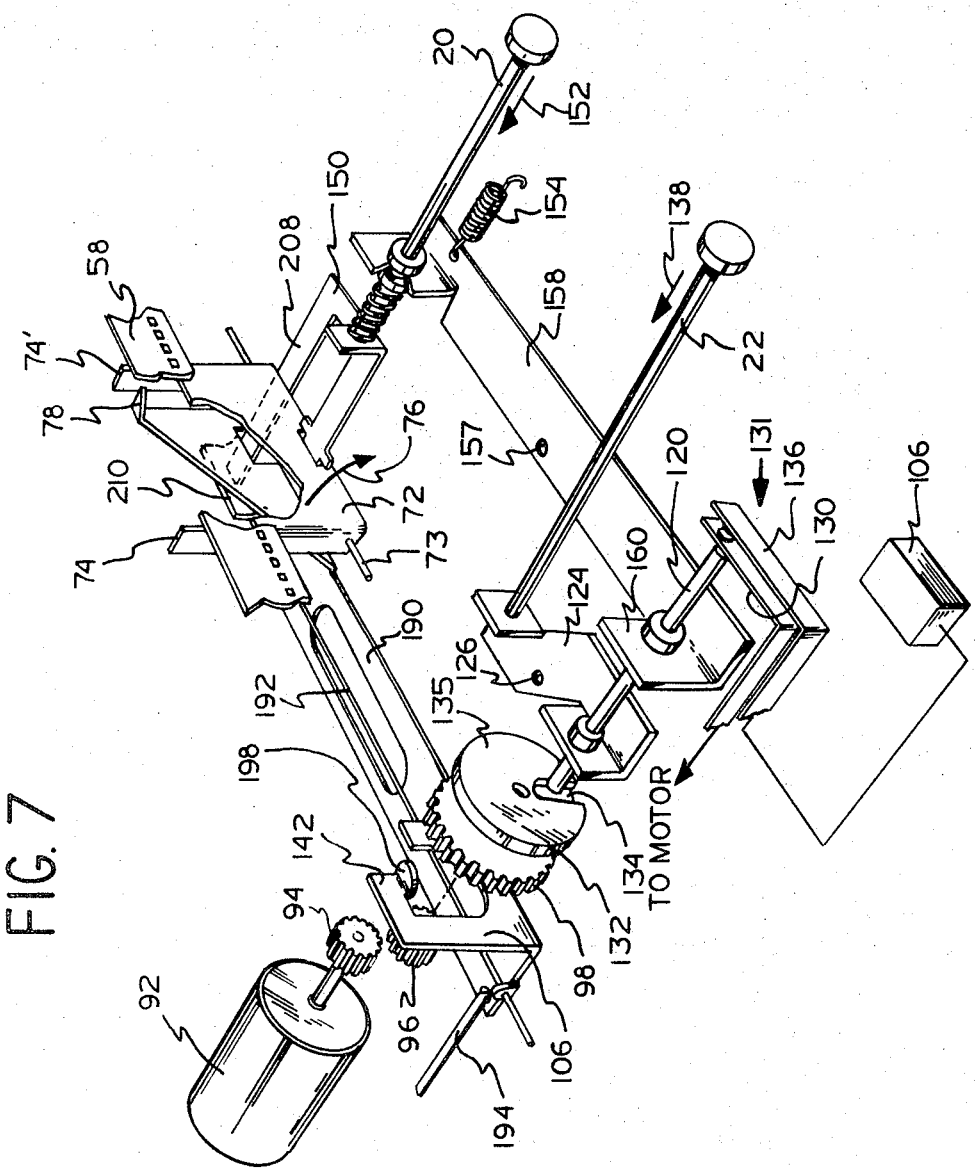
FIG. 7 is a perspective view of a control mechanism used in the microfilm viewer of FIG. 1.
Figure 8:
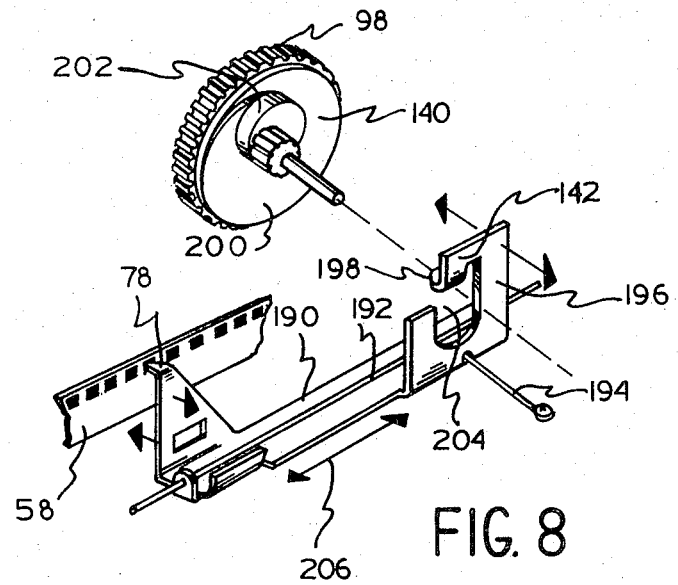
FIG. 8 is a perspective exploded view of a cam and microfilm viewer of FIG. 1.

Either single film frame advance or continuous film motion is obtained with the interlocked control illustrated in FIGS. 7 and 8 in greater detail. The film claw 78 is used to provide an incremental film advance corresponding to the spacing between successive microfilm frames. The microfilm engaging claw 78 is located on a common bracket 190 with the cam follower 142. Bracket 190 is pivotally mounted to the housing by a pin 192 which is oriented parallel to the direction of movement of the microfilm 58. The bracket 190 further is mounted to slide along the pin 192 and is held in a preferred position and orientation on pin 192 by a leaf spring 194.

In the single frame advance mode the film claw 78 executes a generally rectangular path, a portion of which is obtained with the claw 78 pivoted towards the film 58 (for film advance), and the remainder obtained with the claw pivoted away from film 58 (for claw return without retracting the film). This film claw motion is produced by the interaction between the cam follower 142 and cam 140 as more particularly illustrated in FIG. 8.

As shown in FIG. 8 the cam follower 142 is formed of a generally U-shaped extension 196 with a rounded tip 198. The tip 198 extends towards an annular cam surface 200 which varies in height to cause a pivotal motion of the cam follower 142 and thus also the film claw 78. The cam 140 is provided with an eccentrically located hub 202 protruding into the aperture 204 formed by the U-shaped extension 196. Hence, rotation of cam 140 produces sliding movement of bracket 190 along the pivot pin 192 as indicated by arrow 206.

The combined effect of the cam surface 200 and hub 202 is a three dimensional movement of the film claw 78. The first motion provides engagement of the film claw 78 with a microfilm sprocket hole, and this is followed by a movement along the pivot pin 192 to advance the film. The claw 78 then is separated or pivoted away from the microfilm 58 and returned to an initial position after a complete revolution of the cam 140.

When one desires to advance the film by a single frame, the lever 22, as shown in FIG. 7, is momentarily actuated in the direction of arrow 139. This causes the stop shaft 120 to move out of the stop recess 134 against contact 130 and close the control switch 131 to energize the motor 92. The cam 140 is now rotated while the stop shaft 120 rides over the surface 135 of stop wheel 132. During this cam rotation the film claw 78 is actuated through its frame advancing motion. When the stop recess 134 has again rotated opposite the stop shaft 120, the latter is moved away from switch 131 (under spring action from contact 130) to open the control switch 131 and prevent further rotation of the cam 140. The angular position of the stop recess 134 relative to the cam 140 is so selected that the film claw 78 is returned to the beginning of a single frame advancing position each time the stop shaft 120 engages the recess 134.

When one desires continuous film advance, the lever 20 is moved in the direction of arrow 152 to effect both a release of stop shaft 120 from the stop wheel 132 and a pivoting away of claw 78 and the cam follower 142. This pivotal movement is obtained by control member 150 which has an arm 208 to seat against a lip 210 extending upwardly from bracket 190. Since the claw 78 may at times tend to pull the film 58 during a backward pivot motion, the film gate 72 is actuated by arm 212 of control member 150 and thereby made to pivot in the direction of arrow 76 to assure claw separation from the microfilm 58.

It will now be appreciated that the present device folds compactly when not in use, and has provision for forward or reverse rapid and continuous film advance as well as single frame operation, all governed by convenient, interlocked function control levers located atop the housing for ready access during table-top use.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. A control for a microfilm viewer comprising
 a housing including a microfilm viewing port, said housing being shaped to operatively support a cassette containing microfilm bearing a plurality of image frames, and means for driving the microfilm in the cassette past the film viewing port,
 a film gate located alongside the film viewing port and pivotally mounted to the housing for movement against the film and away from the viewing port,
 a film claw shaped to positively engage the microfilm, said film claw being movably mounted to the housing and coupled to the driving means for a repeatable motion selected to advance the microfilm a distance corresponding to a dimension of an image frame,
 a single frame control wheel driven into rotation by the driving means and having a stop,
 a stop shaft disposed to normally engage the single frame control wheel stop and mounted to the housing for movement towards and away from the single frame control wheel,
 a control switch mounted adjacent the stop shaft for actuation thereby upon release movement of the stop shaft away from the single frame control wheel stop,
 a single frame control lever projecting from the housing and coupled to the stop shaft to initiate release movement and enable said driving means to actuate the film claw for single frame advancement thereof,
 a continuous film advance control lever projecting from the housing and disposed for movement towards and away from the film claw and the film gate to separate the film claw from the microfilm, said continuous film advance control lever further being coupled to the stop shaft to initiate a release movement thereof and actuation of the control switch for a continuous advance of the microfilm commensurate with the duration of the actuation of the continuous film advance control lever.

2. The control for a microfilm viewer in claim 1 wherein said driving means further includes a three-dimensional cam mounted for rotation with the single frame control wheel, said cam further having a hub eccentrically located with respect to the control wheel axis of rotation and an axially extending cam surface, and said film claw having a cam follower extension in operative engagement with the cam,
 said film claw being pivotally mounted to the housing about a pivot axis oriented substantially parallel to the direction of movement of the microfilm at the viewing port, said film claw further being slidable along said pivot axis for microfilm advancement, said cam hub being effective on the cam follower extension of the film claw to provide microfilm advancing motion of the film claw along the pivot axis and the axially extending surface of the cam being effective to pivot the film claw about its pivot axis for engagement and release of the microfilm.

3. The control for a microfilm viewer in claim 2 wherein said cam follower extension is provided with a recess shaped to snugly receive the cam hub and a cam follower tip projecting towards the axially extending cam surface, said cam tip being selectively spaced from the pivot axis for the film claw to cause a desired pivot movement thereof for each single frame microfilm advance.

4. The control for a microfilm viewer in claim 2 wherein said continuous film advancing lever engages said film gate to cause a pivotal movement thereof against the microfilm and engages the film claw at a location selected to pivot the film claw about its pivot axis away from the microfilm and away from said cam to enable free continuous advance of the microfilm.

5. The control for a microfilm viewer in claim 1 further including a first link pivotally mounted to the housing and having one end of the first link pivotally coupled to the single frame control lever and the other end of the first link being coupled to the stop shaft,
   a second link pivotally mounted to the housing, said second link having one end on one side of the second link pivotally coupled to the continuous film advancing lever and another end on the other side of the second link pivotally coupled to the stop shaft,
   said other ends of both said first and second links engaging said stop shaft for respectively independent release movement of the stop shaft in correspondence with control switch actuation.

6. The control for a microfilm viewer in claim 1 wherein the film gate is shaped with a pair of extending posts located alongside the viewing port and the film claw is operatively located between the posts.

7. The control for a microfilm viewer in claim 1 and further including
   means for controlling the direction of movement of the microfilm upon actuation of the control switch.

* * * * *